United States Patent [19]

Reineke et al.

[11] Patent Number: 4,851,120

[45] Date of Patent: Jul. 25, 1989

[54] ANIONIC POLYSACCHARIDE SEPARATION MEMBRANES

[75] Inventors: Charles E. Reineke; James A. Jagodzinski, both of Midland, Mich.

[73] Assignee: The Dow Chemical Company, Midland, Mich.

[21] Appl. No.: 863,626

[22] Filed: May 15, 1986

Related U.S. Application Data

[63] Continuation-in-part of Ser. No. 602,786, Apr. 23, 1984, abandoned, which is a continuation-in-part of Ser. No. 403,259, Jul. 29, 1982, abandoned.

[51] Int. Cl.$^4$ ............................................. B01D 13/00
[52] U.S. Cl. .................................. 210/500.25; 55/158; 210/500.79; 210/500.41; 428/315.5
[58] Field of Search ................... 210/500.25, 500.29, 210/500.41; 55/158; 428/315.5, 315.7, 315.9

[56] References Cited

U.S. PATENT DOCUMENTS

| | | | |
|---|---|---|---|
| 2,953,502 | 9/1960 | Binning et al. | 210/640 |
| 3,035,060 | 5/1962 | Binning et al. | 210/640 |
| 3,367,787 | 2/1968 | Thijssen et al. | 426/492 |
| 3,660,431 | 5/1972 | Hatch et al. | 528/206 X |
| 3,749,737 | 7/1973 | Hatch et al. | 528/150 X |
| 3,750,735 | 8/1973 | Chiang et al. | 210/640 X |
| 3,892,665 | 7/1975 | Steigelmann et al. | 210/500.2 X |
| 3,898,247 | 8/1975 | Schmidt et al. | 528/364 X |
| 3,950,247 | 4/1976 | Chiang et al. | 210/640 |
| 4,035,291 | 7/1977 | Chiang et al. | 210/640 |
| 4,067,805 | 1/1978 | Chiang et al. | 210/500.2 X |
| 4,242,159 | 12/1980 | Klimmek et al. | 210/500.2 X |
| 4,244,824 | 1/1981 | Lange et al. | 210/500.2 |
| 4,249,000 | 2/1981 | Batzer et al. | 210/500.2 X |
| 4,329,383 | 5/1982 | Joh | 210/500.2 X |
| 4,720,345 | 1/1988 | Linder et al. | 210/500.29 |

FOREIGN PATENT DOCUMENTS

| | | |
|---|---|---|
| 0062494 | 10/1982 | European Pat. Off. |
| 1578813 | 3/1968 | France |
| 568726 | 4/1945 | United Kingdom |
| 1351188 | 4/1974 | United Kingdom |

OTHER PUBLICATIONS

Kirk–Othmer Encyclopedia of Chemical Technology, 3rd Ed. vol. 5, John Wiley and Sons, N.Y., 1979, p. 143–163 "Cellulose Derivatives".

Chemical Abstracts, vol. 82, No. 6, 2/10/75, p. 24, No. 31811n, M. Rinaudo et al., "Preparation of a Polysaccharide...".

Sourirajan, S. *Reverse Osmosis,* Academic Press, N.Y. 1970, pp. 69–73.

Patents Abstracts of Japan, vol. 3, No. 63 (C–47) May 30, 1979, p. 24, C 47; JP-A-54, 36388 (Sumitomo Denki Kogyo K.K.) 17-03-1979.

*Primary Examiner*—W. Gary Jones

[57] ABSTRACT

A process for the separation of water from water-miscible organic compounds, comprising contacting a mixture of water and an organic compound against one side of a membrane comprising a salt of an anionic polysaccharide or blends thereof with a noncellulosic polyanion, and withdrawing at the other side of said membrane a mixture having a higher concentration of water.

8 Claims, No Drawings

ANIONIC POLYSACCHARIDE SEPARATION MEMBRANES

REFERENCE TO RELATED APPLICATIONS

This Application is a continuation-in-part of copending U.S. patent application Ser. No. 602,786, filed Apr. 23, 1984, now abandoned which is a continuation-in-part of application Ser. No. 403,259, filed July 29, 1982, and now abandoned.

BACKGROUND OF THE INVENTION

This invention relates to separation membranes and to methods for removing water from organic compounds using separation membranes.

The effective removal of water from organic fluids is important in pollution control and in numerous industries such as in distilleries, the preparation of the anhydrous chemicals and the like. While gross separations are comparatively simple when the organic compound is immiscible with water, many organic compounds are partially or completely soluble in water. Separation of such organic compounds from water is sometimes carried out by distilling the mixture but this process requires large amounts of energy. Moreover, some organic liquids which have boiling points close to that of water or which form azeotropic mixtures with water cannot be readily separated using a distillation process.

It has been found that certain materials, when formed into thin membranes, possess the capacity to selectively permit water to pass therethrough while preventing the passage of organic compounds. Thus, Binning et al. in U.S. Pat. Nos. 2,953,502 and 3,035,060 teach the separation of ethanol from water using cellulose acetate and hydrolyzed polyvinyl acetate membranes. Chiang et al. in U.S. Pat. Nos. 3,750,735; 3,950,247; 4,035,291 and 4,067,805 describe the separation of formaldehyde from water employing a variety of membranes.

Unfortunately, previously known separation membranes do not exhibit a selectivity as high as desired for many applications; that is, the water which permeates therethrough contains substantial amounts of organic compounds. Thus, it would be desirable to develop a separation membrane which more efficiently separates water from organic compounds.

SUMMARY OF THE INVENTION

The present invention is a water-selective permeation membrane comprising a substantially nonporous anionic separation layer consisting essentially of a polysaccharide composition. The polysaccharide is selected from the group consisting of alginic acid, carboxyalkyl cellulose, carboxyalkylalkyl cellulose, sulfoalkyl cellulose, cellulose sulfate, cellulose phosphate, cellulose arsenate, cellulose phosphinate, cellulose tellurate and ether derivatives thereof. The polysaccharide contains a plurality of pendant anionic groups in salt form, said anionic groups being present in an amount sufficient to allow the membrane separation layer to permeate water while substantially impeding the permeation of organic compounds therethrough.

In another aspect, this invention is a permeation membrane comprising a blend of the aforementioned anionic polysaccharide or with a nonpolysaccharide polymer having a plurality of anionic groups in salt form. The membrane of this invention exhibits surprisingly good selectivity for water, i.e., when contacted on one side with a fluid mixture of an organic compound and water, it allows water to permeate therethrough while substantially preventing the permeation of the organic materials therethrough.

In yet another aspect, this invention is a method for separating water from a mixture containing water and an organic compound, said method comprising contacting one side of a membrane as described hereinbefore with a fluid mixture comprising water and a water-miscible organic compound and withdrawing from the other side of said membrane, as a vapor, a permeate containing a substantially higher concentration of water. According to this method, surprisingly efficient separations of water and organic compounds can be effected, with the permeate containing a higher concentration of water than permeates obtained using conventional separation membranes.

DETAILED DESCRIPTION OF THE INVENTION

The polysaccharides or derivatives thereof suitably employed in this invention are those which contain a plurality of pendant anionic groups. Said anionic groups are derived from strong or weak acids and include $-SO_3^-$, $-OSO_3^-$, $-COO^-$, $-AsO_3^-$, $-TeO_3^-$, $-PO_3^-$, $-HPO_3^-$ and the like, with sulfate, sulfonate and carboxylate groups being preferred. The anionic polysaccharide derivative useful in this invention is one of alginic acid, carboxyalkyl cellulose, carboxyalkylalkyl cellulose, sulfoalkyl cellulose, cellulose sulfate, cellulose phosphate, cellulose arsenate, cellulose phosphinate, cellulose tellurate and ether derivatives thereof. Especially preferred are salts of carboxylate, sulfate or sulfonate-containing cellulose derivatives. More preferred are salts of carboxyalkyl cellulose or sulfoalkyl cellulose, optionally bearing $C_1$ to $C_4$ alkyl ether or hydroxyalkyl ether groups. Most preferred are salts of carboxymethyl cellulose.

In addition to the specifically mentioned anionic polysaccharide listed hereinbefore, ether derivatives thereof are also useful herein. By "ether derivative", it is meant that one or more of the hydroxyl groups of the anhydroglucose unit of the polysaccharide chain is substituted with an ether group. Said ether group is nonionic and of relatively low molecular weight. The ether group is preferably a $C_1$-$C_4$ alkoxyl or $C_1$-$C_4$ hydroxyalkoxyl group, more preferably an ethoxyl, methoxyl, hydroxypropoxyl or hydroxyethoxyl group. Said ether group, when present, is advantageously present such that the polysaccharide has an ether molar substitution of 2.0 or less, preferably 1.0 or less. In general, the amount of said ether group is sufficiently small that its presence does not substantially increase the permeability of the polysaccharide to organic compounds.

Polysaccharides such as alginic acid contain anionic groups and do not need chemical modification to place anionic groups thereon. Cellulose, however, does not contain anionic groups and must be modified to impart anionic groups thereto. Anionic groups are generally attached to polysaccharides by substitution of one or more of the hydroxyl groups on the anhydroglucose units of the polysaccharide molecule. Various methods for affixing anionic groups to polysaccharide molecules are known in the art and are described, for example, in Greminger, "Cellulose Derivatives, Ethers," in *Kirk-Othmer Encyclopedia of Chemical Technology*, 3d Ed., Vol. 5, John Wiley and Sons, New York (1979). Carboxyalkyl groups, for example, can be attached to cellulose by the reaction of cellulose with a haloalkylcarboxylate. The alkyl group can contain up to five carbon atoms but because the alkyl group tends to impart hydrophobic characteristics to the molecule, it is preferred that the alkyl group be methyl or ethyl. Cellulose sulfate can be prepared by reacting cellulose with mixtures of sulfuric acid and aliphatic alcohols, followed by neutralization with sodium hydroxide, or alternatively by reacting a dimethylformamide-sulfur trioxide complex with cellulose using excess dimethylformamide as the solvent. It is noted that membranes prepared from cellulose sulfate are brittle when dry and are advantageously kept moist after its preparation and throughout the period of its use. Cellulose phosphate is advantageously prepared by reacting cellulose with phosphoric acid in molten urea, or with a mixture of phosphoric acid, phosphorus pentoxide and an alcohol diluent.

In addition to the methods described hereinbefore, the hydroxymethyl groups of cellulose and like polysaccharides can be converted directly to carboxylate groups by oxidation and hydrolysis according to well-known processes.

When a cellulose derivative is employed in the membrane, the amount of anionic substitution on a cellulose molecule is expressed as the average number of anionic groups per anhydroglucose unit of the molecule (degree of substitution (DS)). Since there are three hydroxyl groups per anhydroglucose unit of a cellulose molecule, the DS can range from 0 to 3. For the purpose of this invention, the anionic degree of substitution must be sufficiently high that the materials prepared therefrom will allow water to permeate therethrough while substantially impeding the permeation of organic compounds. Advantageously, the DS is in the range from about 0.1 to 3.0, preferably from about 0.3 to about 1.5.

The anionic polysaccharide or polysaccharide derivative is in the salt form, the counterion being any cation which forms an ionic bond with the anionic groups of the polymers. Said cations generally include alkali metals, alkaline earth metals, transition metals, as well as ammonium ions of the form, $R_4N^+$, where each R is preferably hydrogen or methyl. Because of their relative ease in preparation and improved selectivity, the counterion is preferably an alkali metal. More preferably, the counterion is sodium, potassium or cesium. It has been found that the selectivity and the permeation rate, i.e., the rate at which water permeates the membrane, are dependent on the choice of the counterion. For alkali metals, the water permeation rate through the membrane generally increases as the counterion is changed from sodium to potassium to cesium. However, the selectivities of the membranes of the invention are superior to those of conventional separation membranes even when cesium is employed as the counterion. Mixed counterions are also operable.

The anionic polysaccharide or polysaccharide derivative is advantageously converted to salt form by contacting said derivative with a dilute solution of the hydroxide of the desired counterion. Generally, the salt can be formed in this manner at ambient conditions using relatively dilute, i.e., 0.02 to 1 molar solutions of the desired hydroxide. When the cationic species forms an insoluble hydroxide, a solution of a soluble salt of said cation is contacted with the anionic polysaccharide in order to convert said anionic polysaccharide to the desired salt form through an ion exchange process.

The membrane separation layer of this invention is substantially non-porous. By substantially non-porous, it is meant that, except for occasional defects or pinholes, the membrane contains essentially no pores greater than about 0.05 microns in diameter. In such a membrane, there are essentially no pores through which bulk passage of the permeate can occur. In the membrane of this invention, it is believed that the permeate passes through the membrane on essentially a molecular level.

In a preferred embodiment of this invention, the anionic polysaccharide or polysaccharide derivative is blended with a polyanion which is not a polysaccharide but does have a plurality of anionic groups in salt form. The anionic group is advantageously a carboxylalkyl, sulfate, sulfonate, sulfoalkyl, phosphate, phosphenate, arsenate or tellurate group. In general, the polyanion is chosen such that it forms solutions which are sufficiently compatible with solutions of the anionic polysaccharide or polysaccharide derivative such that blends can be produced therefrom. The polyanion is employed in the salt form, with the counterions being those described hereinbefore. The polyanion can be a homopolymer containing repeating anionic units such as polyacrylic acid or poly (sodium vinylsulfonate), or may be a copolymer having repeating anionic units and repeating nonionic units such as a styrene/sodium vinylsulfonate copolymer or sodium acrylate/alkyl acrylate copolymers. The polyanion has a molecular weight sufficiently high that films prepared therefrom do not rapidly dissolve or lose integrity in the presence of the water/organic mixture to be contacted therewith. Preferably, the polyanion is a homopolymer of an ethylenically unsaturated sulfonate or carboxylate with sodium polyacrylate, sodium poly(vinyl sulfonate) and sodium poly(styrene sulfonate) being preferred.

The polyanion is employed in amounts sufficient to increase the charge density of the membrane but in amounts less than that which causes substantial incompatability with the anionic polysaccharide derivative in the preparation of the membrane. Generally, such substantial incompatibility is evidenced by the separation of a solution containing these components into distinct phases. Said phase separation makes it difficult to prepare a film which is a blend of the polyanion and the polysaccharide. In general, the polyanion will comprise up to about 70 weight percent, preferably less than 50 weight percent, more preferably less than 30 weight percent of the membrane.

The membranes of this invention are advantageously formed into the desired shape by casting films of the membrane onto a suitable surface and removing the solvent therefrom. Said films may be, for example, flat, concave, convex, or in the form of hollow fibers or tubular shapes. Preferably, the membrane is cast from an aqueous solution. The solvent is generally removed by evaporation at ambient conditions or at elevated temperatures, low pressures, or by other suitable techniques. Membranes which are blends of an anionic polysaccharide or polysaccharide derivative and a polyanion are generally formed in the manner described hereinbefore by casting a film from the solution containing both materials. Solutions containing both the anionic polysaccharide derivative and the polyanion are advantageously prepared by mixing solutions of the anionic polysaccharide derivative with a solution of the polyanion or by mixing finely divided particles of each material and dissolving the mixture into a suitable solvent.

The anionic polysaccharide derivative and the polyanion described hereinbefore are generally soluble in water and the use thereof is generally restricted to feed mixtures having relatively low concentrations of water, i.e., less than 50 weight percent water. Accordingly, it is preferred to crosslink the membranes in order to render them insoluble in water. Crosslinking of polysaccharides is known in the art and can be accomplished, for example, by reacting said polysaccharide with glyoxal or epihalohydrin ammonium hydroxide.

When a blend of a polysaccharide and a polyanion is employed, crosslinks may be formed between the polysaccharide and the polyanion, solely between the polysaccharide, or solely between the polyanion. Preferably, the crosslinking agent is a difunctional cyclic sulfonium zwitterion such as is described in U.S. Patent Nos. 3,660,431; 3,749,737 and 3,898,247.

The crosslinking agent is employed in an amount sufficient to render the membrane essentially insoluble in water. The crosslinking agent required will vary depending upon its identity. For example the cyclic sulfonium zwitterion advantageously comprises from about 1 to 30 weight percent of the membrane. The crosslinked membranes of this invention can be effectively employed using feed compositions containing even very high, i.e., 90 weight percent or more, concentrations of water.

In the preparation of crosslinked membranes, the crosslinking agent is advantageously added to a solution of the polysaccharide, and the membrane formed into the desired shape. The membrane is conveniently crosslinked or cured after the removal of the solvent therefrom. The particular means employed for curing the membrane will depend on a variety of factors including the particular polymers and crosslinkers employed. Generally, known procedures for curing crosslinked polymers, such as heating, irradiation and the like, are advantageously employed to crosslink the membranes of the invention.

Polyvalent cationic materials can also be employed to render the anionic polysaccharide less water soluble. For example, displacing the sodium counterion with calcium cations can form ionic bonds which reduce water solubility.

The membrane separation has a minimum thickness such that it is essentially continuous, i.e., there are essentially no pinholes or other leakages between a first and second major surface of the membrane. However, the rate at which water permeates the membranes of this invention is inversely proportional to the thickness of the membrane. Accordingly, it is preferred to prepare a membrane separation layer as thin as possible in order to maximize the permeation rate while ensuring the integrity of the membrane. The thickness of the membrane is advantageously in the range from about 0.1 to 250 microns, preferably from about 10 to about 50 microns.

Mechanical strength can be imparted to the membrane by affixing, laminating or forming the membrane separation layer on a porous supporting material. Particularly thin membranes can be formed by casting the membrane directly onto the porous supporting material. Support materials for composite membranes are known in the art. Illustrative supports include porous polysulfone or polyethersulfone.

Separation of water from organic compounds is effected with the membranes of this invention using general procedures described in U.S. Patent Nos. 3,950,247 and 4,035,291 to Chiang et al. In general, the separation process comprises contacting one side of the membranes of this invention with the fluid mixture containing an organic compound and water and withdrawing from the other side of the membrane a mixture containing a substantially higher concentration of water. The feed mixture can be a mixture of gaseous and liquid components. The permeate side of the membrane is maintained at a pressure less than the vapor pressure of water and is advantageously as low as about 0.1 mm of mercury. Superatmospheric pressure may also be exerted on the feed side of the membrane. The temperature at which the separations are conducted affects both the selectivity and the permeation rate. As the temperature increases, the permeation rate rapidly increases, while selectivity decreases slightly. The increase in rate, however, may be compensated for by the increase in energy needed to maintain the system at an elevated temperature. In general, the temperature is sufficiently high that the water has a substantial vapor pressure at the pressures at which the separation is effected, and is sufficiently low that the membrane remains stable. Advantageously, the temperature is from about $-10°$ C. to about $95°$ C.

The membranes of this invention are most useful in separating water from organic compounds which are miscible with water. Exemplary water-miscible compounds include, but are not limited to, aliphatic alcohols such as methanol, ethanol, propanol, hexanol and the like; ketones such as ethyl methyl ketone, acetone, diethyl ketone and the like; aldehydes such as formaldehyde, acetaldehyde and the like; alkyl esters of organic acids such as ethyl acetate, methylpropionate and the like; p-dioxane, alkyl and cycloalkyl amines and other water-miscible organic compounds which do not chemically react with or dissolve the membranes of this invention. In addition, the organic compound may be one in which water has a limited solubility, such as the chlorinated alkanes like chloroform and carbon tetrachloride. Preferably, the organic compound is an aliphatic alcohol, a ketone, or an aldehyde, with lower alcohols, especially ethanol, being preferred.

The ability of a membrane to selectively permeate one component of a multi-component mixture is expressed as the separation factor $\alpha$ which is defined as $$\alpha_{A/B} = \frac{(\text{wt. }\%\ A/\text{wt. }\%\ B)\text{ in permeate}}{(\text{wt. }\%\ A/\text{wt. }\%\ B)\text{ in feed}}$$

wherein A and B represent the components to be separated. For the purposes of this invention, A will represent water.

The separation factor $\alpha$ is dependent on the type and concentrations of the components in the feed mixture as well as the relative concentrations thereof in the feed. Accordingly, it is also advantageous to express the efficiency of the separation membrane in terms of the composition of the permeate. The separation membranes of this invention will generally have separation factors for water/ethanol mixtures of at least 50 preferably at least 100, more preferably at least 500 and in especially preferred embodiments will have separation factors of 2500 or more. The permeates obtained with the use of the separation membranes of this invention to separate ethanol/water mixtures will generally contain at least 90 weight percent, preferably at least 98 weight percent, more preferably at least 99.5 weight percent water.

The separation membranes of this invention are especially useful in the preparation of anhydrous organic compounds, particularly when said compound forms an azeotropic mixture with water. In such systems, the membranes of this invention present an economical alternative to azeotropic distillation. The membranes of this invention can also be used in conjunction with distillation processes to effect rapid, efficient removal of water from organic compounds.

The following examples are intended to illustrate the invention but not to limit the scope thereof. All parts and percentages are by weight unless otherwise indicated.

Example 1

Membrane Sample No. 1 is prepared from an aqueous solution containing 4.25 percent sodium carboxymethylcellulose. The carboxymethylcellulose has a carboxymethyl degree of substitution of about 0.9. The membranes are prepared by casting an excess of the solution onto a glass plate and allowing the water to evaporate, thereby yielding about a 0.78-mil film.

The following apparatus is used to evaluate membrane Sample No. 1 and the samples in all subsequent examples. The membrane is placed into a Gelman in-line stainless steel filter holder which is modified so that a 14.19 cm$^2$ section of the membrane is open to the feed solution. The membrane is supported with cellulosic filter paper and a porous metal disk. The permeate side of the filter holder is connected to a vacuum pump with two cold traps placed in line to collect the permeate by condensation. The membrane and holder are then immersed in a closed flask containing the mixture to be separated. The flask is equipped with thermocouple or thermometer for measuring temperature and a reflux condenser to prevent feed loss due to evaporation.

Separation is effected by pulling a vacuum of about 0.1 mm/Hg on the permeate side of the membrane and collecting the permeate in the cold traps. The temperature of the feed solution is as indicated in the individual examples. The permeation rate is calculated by periodically weighing the collected permeate. The permeate composition is determined by gas chromatography analysis using a Hewlett Packard 5840A gas chromatograph equipped with a thermal conductivity detector. The column is a 6 ft×⅛ in Poropak QS column.

Sample No. 1 is evaluated according to the foregoing procedure using various ethanol/water mixtures as the feed composition. Each separation is effected at 25° C. until a steady state condition is obtained, i.e., until the permeation rate and permeate content are nearly constant over time. Once a steady state is reached, the content of the permeate and permeation rate are determined. The respective concentrations of water in the feeds, concentrations of water in the permeates, separation factors and permeation rates are as reported in Table I following.

TABLE I

| % H$_2$O in Feed | % H$_2$O in Permeate | Separation Factor | Permeation Rate (g-mil/m$^2$-hr) |
| --- | --- | --- | --- |
| 5.68 | 99.36 | 2578 | 12.2 |
| 9.93 | 99.25 | 1200 | 37.8 |
| 18.19 | 99.49 | 877 | 126.5 |
| 20.10 | 99.62 | 1042 | 128 |

It is seen from the foregoing Table I that the separation membranes made from sodium carboxymethylcellulose exhibit excellent selectivity for water/ethanol mixtures as expressed in terms of the separation factor or as expressed as the composition of the permeate.

Example 2

A 4.25 percent solids solution containing 77 weight percent of the sodium carboxymethylcellulose having a degree of substitution of 0.85 and 23 weight percent sodium polyacrylate (based on the total solids weight) is prepared by mixing separate solutions of the sodium carboxymethylcellulose and the sodium polyacrylate. Membrane Sample No. 2 with a diameter of 14.19 cm$^2$ and a thickness of 0.6 mil is prepared as described in Example I. This membrane is used to separate several ethanol/water mixtures at 25° C. with the results given in Table II following.

TABLE II

| % H$_2$O in Feed | % H$_2$O in Permeate | Separation Factor | Permeation Rate (g-mil/m$^2$-hr) |
| --- | --- | --- | --- |
| 4.4 | 99.6 | 3200 | 7.2 |
| 16.1 | 99.8 | 2600 | 103 |
| 19.7 | 99.7 | 1355 | 161 |
| 24.1 | 99.3 | 447 | 308 |

At all feed compositions, the permeate is essentially free of ethanol when a sodium carboxymethylcellulose/sodium polyacrylate membrane is employed to separate ethanol and water mixtures.

Example 3

Membrane Sample No. 3 comprising 78.5 percent sodium carboxymethylcellulose having a degree of substitution of 0.9 and 21.5 weight percent sodium poly(vinyl sulfonate) is prepared according to the methods described in Example 1. The membrane is 0.5 mil thick and is evaluated with various ethanol/water mixtures at 25° C. with the results as given in Table III following.

TABLE III

| % H$_2$O in Feed | % H$_2$O in Permeate | Separation Factor | Permeation Rate (g-mil/m$^2$-hr) |
| --- | --- | --- | --- |
| 5.6 | 99.3 | 2391 | 4.6 |
| 14.5 | 99.9 | 5891 | 56 |
| 19.1 | 99.9 | 4231 | 114 |

This membrane exhibits very high separation factors at all feed compositions evaluated, with the permeate in each instance comprising almost entirely water.

Example 4

An aqueous solution of the sodium salt of cellulose sulfate having a sulfate degree of substitution of 2.5 is prepared.

A 1.5-mil membrane is prepared in the manner described in Example 1. The membrane is evaluated for 96.25 hours at 25° C. with results as reported in Table IV.

TABLE IV

| Time (hr) | % H$_2$O in Feed | % H$_2$O in Permeate | Separation Factor | Permeation Rate (g-mil/m$^2$-hr) |
| --- | --- | --- | --- | --- |
| 0.75 | 20.20 | 98.68 | 295 | 440.9 |
| 6.79 | 19.79 | 99.64 | 1122 | 413.2 |
| 23.63 | 18.57 | 99.68 | 1366 | 372.8 |
| 96.25 | 14.57 | 99.85 | 3903 | 261.6 |

As can be seen from Table IV, excellent separations are obtained using the cellulose sulfate membrane.

Table V following. The permeate composition, selectivity factor $\alpha$, and permeation rates for each separation are as reported in Table V following.

TABLE V

| Membrane No. | Thickness mil | Organic Compound | % H$_2$O in Permeate | Separation Factor | Permeation Rate (g-mil/m$^2$-hr) |
|---|---|---|---|---|---|
| VIA | 1.18 | ethanol | 99.7 | 2,700 | 50 |
| VIB | 0.76 | 2-propanol | >99.99 (1) | 800,000 | 155 |
| VIC | 1.27 | t-butanol | >99.99 (1) | 800,000 | 224 |
| VID | 1.21 | 1-propanol | 99.997 | 270,000 | 250 |
| VIE | 0.82 | 1-butanol | 98.8 | 730 | 412 |
| VIF | 0.90 | acetone | 99.853 | 5,500 | 424 |

(1) No detectable organic found in permeate.

Example 5

To demonstrate the effect of the counterion on selectivity and permeation rate, a membrane is prepared from 80 percent sodium carboxymethylcellulose having a degree of substitution of 0.9 and 20 percent sodium polyacrylate. This membrane is converted to the hydrogen form by soaking the membrane in a 0.4M HCl solution in 90 percent ethanol and 10 percent water. Conversion to acid form is confirmed from the IR spectrum. The membrane is then soaked in a fresh 90 percent ethanol, 10 percent water solution and evaluated for the separation of ethanol/water solution as described in Example 1. The feed composition initially contains 10.1 percent of water. After 52 hours of operation, the permeate contains 69.8 percent of water yielding a separation factor of 21. The permeation rate is 93 g-mil/m$^2$-hr (2.36 g-mm/m$^2$-hr).

The membrane is then converted to potassium form by soaking in a 0.5M potassium hydroxide solution and 90 percent ethanol, 10 percent water for 3.75 hours. The membrane is then soaked in fresh 90 percent ethanol, 10 percent water solution for 16 hours and dried. The conversion to potassium form is confirmed by IR spectrum. The membrane is then evaluated using an ethanol/water feed containing 20 percent water. When the water content of the feed is reduced to 19.2 percent, the separation factor is 697. When the water content of the feed is reduced to 13.9 percent, the separation factor is 6188. At feed water content of 10.2 percent, the separation factor is 8795. In all cases, the permeate contains over 99 percent water. In addition to the greatly improved separation factor, the permeation rate increases when the membrane is converted to potassium form from about 93 g-mil/m$^2$-hr (2.36 g-mm/m$^2$-hr) to as much as 595 g-mil/m$^2$-hr (14.8 g-mm/m$^2$-hr).

Example 6

Membrane Nos. VIA-VIF, having thicknesses as noted in Table V, are prepared from a 4.25 percent solids aqueous solution containing 80 percent sodium-carboxymethylcellulose and 20 percent sodium polyacrylate, said percentages being based on the weight of the solids. The membrane is used to separate, at 25° C., mixtures containing 11 weight percent water and 89 weight percent of the organic compounds noted in Table V following. The permeate composition, selectivity factor $\alpha$, and permeation rates for each separation are as reported in Table V following.

As can be seen from the foregoing table, the membranes of this invention can be used to perform very efficient separations of water from a variety of organic compounds.

What is claimed is:

1. A composite, water-selective permeation membrane comprising a substantially non-porous anionic separation layer on a porous support, wherein the separation layer consists essentially of a polysaccharide or blend of a polysaccharide with a polyanion, said polyanion comprising up to about 70 weight percent of the membrane, said polysaccharide selected from the group consisting of carboxyalkyl cellulose and derivatives of carboxyalkyl cellulose bearing a plurality of $C_1$ to $C_4$ alkyl ether groups or $C_1$ to $C_4$ hydroxyalkyl ether groups, wherein said separation layer contains a plurality of pendant anionic groups in cesium salt form and said membrane with an ethanol water mixture containing 90 weight percent ethanol exhibits a separation factor of at least 500 for water versus ethanol.

2. The membrane of claim 1 wherein the anionic polysaccharide is a cesium salt carboxyalkylcellulose.

3. The membrane of claim 2 wherein said anionic polysaccharide is a cellulose derivative containing from about 0.1–3.0 anionic groups per anhydroglucose unit of the cellulose molecule.

4. The membrane of claim 3 wherein the cellulose derivative is carboxymethylcellulose.

5. The membrane of claim 1 wherein the anionic polysaccharide contains a plurality of carboxylate groups.

6. The membrane of claim 1 wherein the separation layer is a polysaccharide blend which comprises a polyanion which is not a polysaccharide where said polyanion has a plurality of anionic groups in salt form and is present in an amount sufficient to increase the charge density on said membrane, said polyanion being less than 30 weight percent of the membrane.

7. The membrane of claim 6 wherein the polymer which is not a polysaccharide is a polymer of acrylic acid, vinylsulfonic acid or styrene sulfonic acid.

8. The membrane of claim 1 or 6 which is crosslinked in an amount sufficient to render the membrane insoluble in water.

* * * * *